(12) United States Patent
Fukuta et al.

(10) Patent No.: US 10,588,041 B2
(45) Date of Patent: *Mar. 10, 2020

(54) MOBILE STATION, MEASUREMENT CONTROL METHOD, PROCESSOR, AND BASE STATION

(71) Applicant: KYOCERA CORPORATION, Kyoto (JP)

(72) Inventors: Noriyoshi Fukuta, Inagi (JP); Henry Chang, San Diego, CA (US)

(73) Assignee: KYOCERA Corporation, Kyoto (JP)

( * ) Notice: Subject to any disclaimer, the term of this patent is extended or adjusted under 35 U.S.C. 154(b) by 89 days.

This patent is subject to a terminal disclaimer.

(21) Appl. No.: 15/907,005

(22) Filed: Feb. 27, 2018

(65) Prior Publication Data

US 2018/0192317 A1  Jul. 5, 2018

Related U.S. Application Data

(63) Continuation of application No. 15/251,555, filed on Aug. 30, 2016, now Pat. No. 9,942,789, which is a
(Continued)

(51) Int. Cl.
*H04W 24/10* (2009.01)
*H04W 4/06* (2009.01)

(52) U.S. Cl.
CPC ............ *H04W 24/10* (2013.01); *H04W 4/06* (2013.01)

(58) Field of Classification Search
CPC .............................. H04W 84/18; H04W 84/12
See application file for complete search history.

(56) References Cited

U.S. PATENT DOCUMENTS 9,277,437 B2  3/2016 Wu
2010/0271952 A1* 10/2010 Nickisch ........... H04W 36/0088
370/241

(Continued)

FOREIGN PATENT DOCUMENTS

JP  2015-133704 A  7/2015
WO  2013/074751 A1  5/2013

OTHER PUBLICATIONS

Extended European Search Report (EESR) dated Sep. 8, 2017, from corresponding EP Appl No. 15765527.5, 16 pp.

(Continued)

*Primary Examiner* — Zhiren Qin
(74) *Attorney, Agent, or Firm* — Studebaker & Brackett PC

(57) ABSTRACT

A mobile station receives from a network a first minimization of drive test (MDT) configuration configuring a multicast-broadcast single-frequency network (MBSFN) measurement, and performs and logs measurement based on the configuration. When logged measurement is non-MBSFN measurement, the mobile station transmits a non-MBSFN measurement availability indicator to the network at a timing of handover, where the indicator indicates an availability of logged non-MBSFN measurement. When logged measurement is MBSFN measurement, the mobile station transmits an MBSFN measurement availability indicator to the network at a timing of handover in response to the MBSFN measurement being not ongoing, where the indicator indicates an availability of logged MBSFN measurement. The mobile station refrains from transmitting availability indicator to the network at the timing of handover in the network in response to the MBSFN measurement being still ongoing, even if the mobile station has the logged MBSFN measurement at the timing of handover.

3 Claims, 9 Drawing Sheets

Related U.S. Application Data continuation of application No. PCT/JP2015/058590, filed on Mar. 20, 2015.

(60) Provisional application No. 61/968,004, filed on Mar. 20, 2014, provisional application No. 61/991,057, filed on May 9, 2014.

(56) References Cited

U.S. PATENT DOCUMENTS

| | | | | |
|---|---|---|---|---|
| 2012/0108199 | A1* | 5/2012 | Wang | H04W 76/10 |
| | | | | 455/405 |
| 2013/0128756 | A1* | 5/2013 | Zhang | H04W 4/06 |
| | | | | 370/252 |
| 2013/0178211 | A1* | 7/2013 | Wang | H04W 24/02 |
| | | | | 455/436 |
| 2013/0183978 | A1* | 7/2013 | Keskitalo | H04W 24/10 |
| | | | | 455/436 |
| 2013/0190011 | A1* | 7/2013 | Kim | H04W 64/00 |
| | | | | 455/456.1 |
| 2013/0196650 | A1* | 8/2013 | Futaki | H04W 24/10 |
| | | | | 455/424 |
| 2014/0044067 | A1* | 2/2014 | Lin | H04W 24/10 |
| | | | | 370/329 |
| 2015/0201344 | A1* | 7/2015 | Wu | H04W 4/06 |
| | | | | 370/252 |
| 2015/0281990 | A1* | 10/2015 | Kelley | H04W 24/10 |
| | | | | 370/241 |
| 2015/0373506 | A1* | 12/2015 | Jung | H04L 12/189 |
| | | | | 370/312 |

OTHER PUBLICATIONS

Qualcomm Incorporated, "MBSFN Measurement for MDT," 3GPP TSG-RAN WG2#85, R2-140103, Prague, Czech Republic, Feb. 10-14, 2014, 6 pp.

Ericsson, ST-Ericsson, "Further details on logged MDT measurement reporting," 3GPP TSG-RAN WG2 #70, Tdoc R2-103086, Montreal, Canada, May 10-14, 2010, 6 pp.

Mediatek Inc., Qualcomm, "Introduction of MBMS operations support for E-UTRA," 3GPP TSG-RAN WG2 Meeting #86, R2-142916, Seoul, Korea, May 19-23, 2014, 20 pp.

Kyocera, "Simultaneous MDTs and availability indicator," 3GPP TSG-RAM WG2 #86, R2-142254, Seoul, Republic of Korea, May 19-23, 2014, 4 pp.

JP Office Action from corresponding JP Appln No. 2016-508839 dated Nov. 22, 2016, with concise statement of relevance, 4 pp.

International Search Report issued in PCT/JP2015/058590; dated Jun. 16, 2015.

Written Opinion issued in PCT/JP2015/058590; dated Jun. 16, 2015.

3rd Generation Partnership Project; Technical Specification Group Radio Access Network; Universal Terrestrial Radio Access (UTRA) and Evolved Universal Terrestrial Radio Access (E-UTRA); Radio measurement collection for Minimization of Drive Tests (MDT); Overall description; Stage 2; 3GPP TS 37.320 V11.3.0; Mar. 2013; pp. 1-23; Release 11; 3GPP Organizational Partners.

* cited by examiner

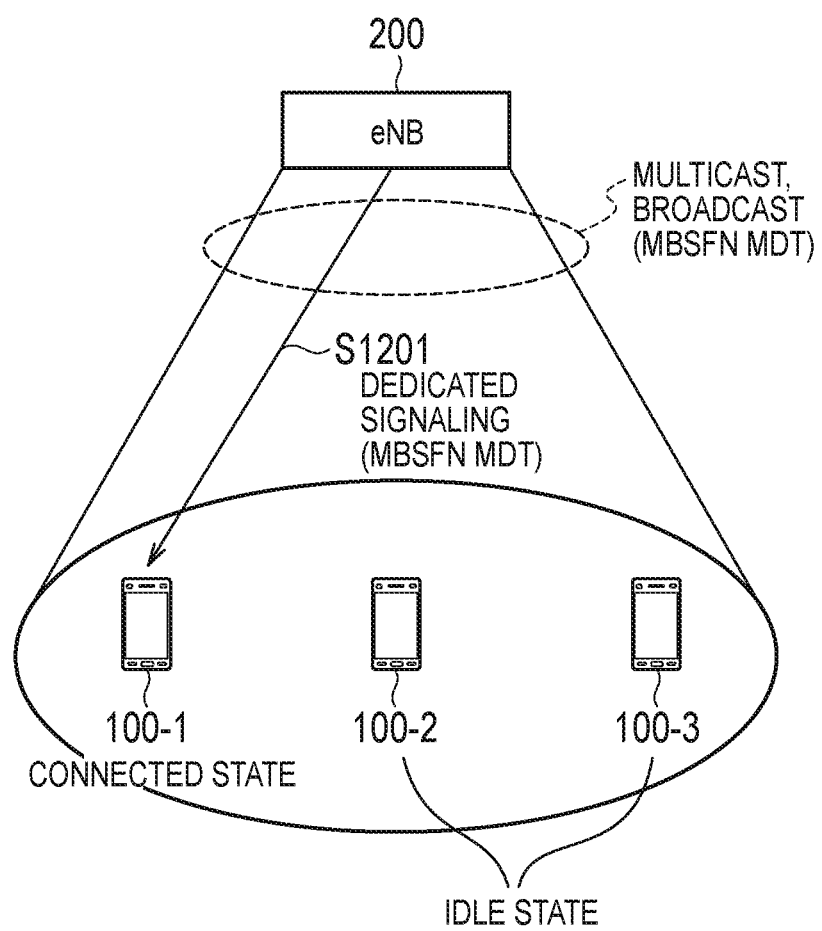

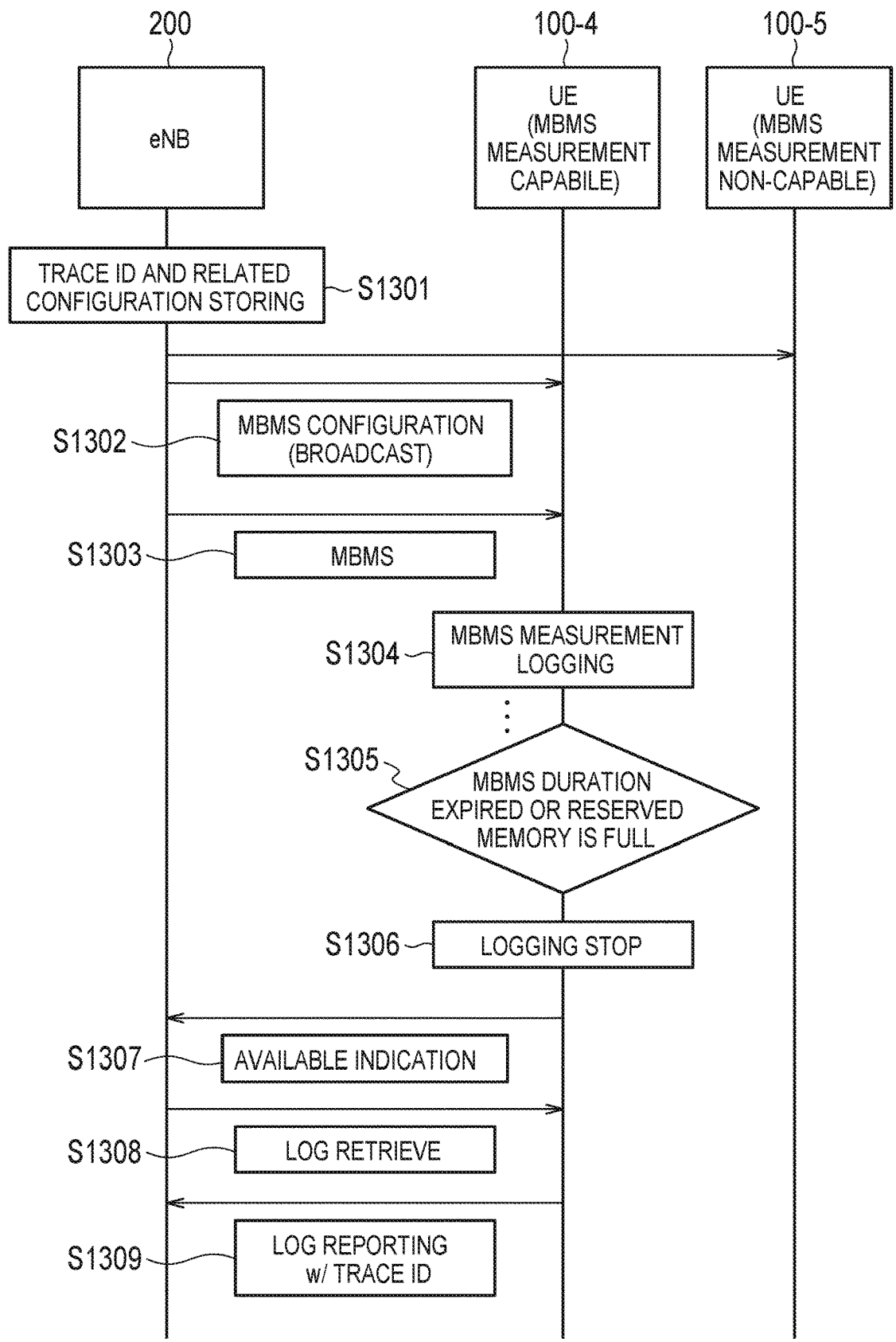

MOBILE STATION, MEASUREMENT CONTROL METHOD, PROCESSOR, AND BASE STATION

CROSS-REFERENCE TO RELATED APPLICATIONS

This application is a Continuation Application of U.S. patent application Ser. No. 15/251,555 filed Aug. 30, 2016, which is a Continuation Application of International Patent Application No. PCT/JP2015/058590 filed Mar. 20, 2015, which claims benefit of U.S. Provisional Application Nos. 61/968,004 filed Mar. 20, 2014 and 61/991,057 filed May 9, 2014, the entire contents of which are incorporated herein by reference.

TECHNICAL FIELD

The present disclosure relates to a measurement control method used in a mobile communication system.

BACKGROUND ART

In a mobile communication system, if a building is built in the vicinity of a base station, or if the installation status of neighboring base stations change, then the radio environment related to the base station changes. Therefore, conventionally, a drive test is performed by an operator where a measurement vehicle mounted thereon with a measurement equipment is used to measure a radio environment and location information to thereby collect a measurement log. Here, the radio environment is received power of a reference signal (RSRP: Reference Signal Received Power) received from a base station, for example.

Such a measurement and collection is capable of, for example, contributing to the optimization of a coverage; however, there is a problem that too many man-hours are required and thus, a high cost ensues. Thus, according to 3GPP (3rd Generation Partnership Project), which is a project aiming to standardize a mobile communication system, an MDT (Minimization of Drive Test) specification is designed where a user terminal is used for automation of the measurement and collection (see Non Patent Document 1).

PRIOR ART DOCUMENTS

Non Patent Document

Non Patent Document 1: 3GPP Technical Specification "TS37.320 V11.3.0" March, 2013

SUMMARY

The present disclosure provides a mobile station and method for appropriate measurement and collection.

A mobile station according to the present disclosure comprises at least one processor configured to execute processes of receiving a first minimization of drive test (MDT) configuration that configures a multicast-broadcast single-frequency network (MBSFN) measurement, from a network, and performing and logging the MBSFN measurement based on the first MDT configuration. When a logged measurement is a non-MBSFN measurement, the mobile station transmits a non-MBSFN measurement availability indicator to the network at a timing of handover in the network, where the non-MBSFN measurement availability indicator indicates an availability of logged non-MBSFN measurement. When a logged measurement is an MBSFN measurement, the mobile station transmits an MBSFN measurement availability indicator to the network at a timing of handover in the network in response to the MBSFN measurement being not ongoing, where the MBSFN measurement availability indicator indicates an availability of logged MBSFN measurement. The mobile station controls not to transmit the MBSFN measurement availability indicator to the network at the timing of handover in the network in response to the MBSFN measurement being still ongoing, even if the mobile station has the logged MBSFN measurement at the timing of handover in the network.

A measurement control method for a mobile station according to the present disclosure comprises receiving a first minimization of drive test (MDT) configuration that configures a multicast-broadcast single-frequency network (MBSFN) measurement, from a network, and performing and logging the MBSFN measurement based on the first MDT configuration. When a logged measurement is a non-MBSFN measurement, the method transmits a non-MBSFN measurement availability indicator to the network at a timing of handover in the network, where the non-MBSFN measurement availability indicator indicates an availability of logged non-MBSFN measurement. When a logged measurement is an MBSFN measurement, the method transmits an MBSFN measurement availability indicator to the network at a timing of handover in the network in response to the MBSFN measurement being not ongoing, where the MBSFN measurement availability indicator indicates an availability of logged MBSFN measurement. The method controls not to transmit the MBSFN measurement availability indicator to the network at the timing of handover in the network in response to the MBSFN measurement being still ongoing, even if the mobile station has the logged MBSFN measurement at the timing of handover in the network.

A device for a mobile station according to the present disclosure comprises at least one processor configured to cause the mobile station to receive a first minimization of drive test (MDT) configuration that configures a multicast-broadcast single-frequency network (MBSFN) measurement, from a network, and perform and log the MBSFN measurement based on the first MDT configuration. When a logged measurement is a non-MBSFN measurement, the device transmits a non-MBSFN measurement availability indicator to the network at a timing of handover in the network, where the non-MBSFN measurement availability indicator indicates an availability of logged non-MBSFN measurement. When a logged measurement is an MBSFN measurement, the device transmits an MBSFN measurement availability indicator to the network at a timing of handover in the network in response to the MBSFN measurement being not ongoing, where the MBSFN measurement availability indicator indicates an availability of logged MBSFN measurement. The device controls not to transmit the MBSFN measurement availability indicator to the network at the timing of handover in the network in response to the MBSFN measurement being still ongoing, even if the mobile station has the logged MBSFN measurement at the timing of handover in the network.

BRIEF DESCRIPTION OF DRAWINGS

FIG. 12 is a configuration diagram of the LTE system according to the fifth embodiment.

FIG. 13 is a sequence diagram of MBMS MDT according to the first embodiment to the sixth embodiment.

DESCRIPTION OF EMBODIMENTS

First Embodiment

Hereinafter, an embodiment for applying the present disclosure to an LTE system is explained.

(1) System Configuration

Figure 1:
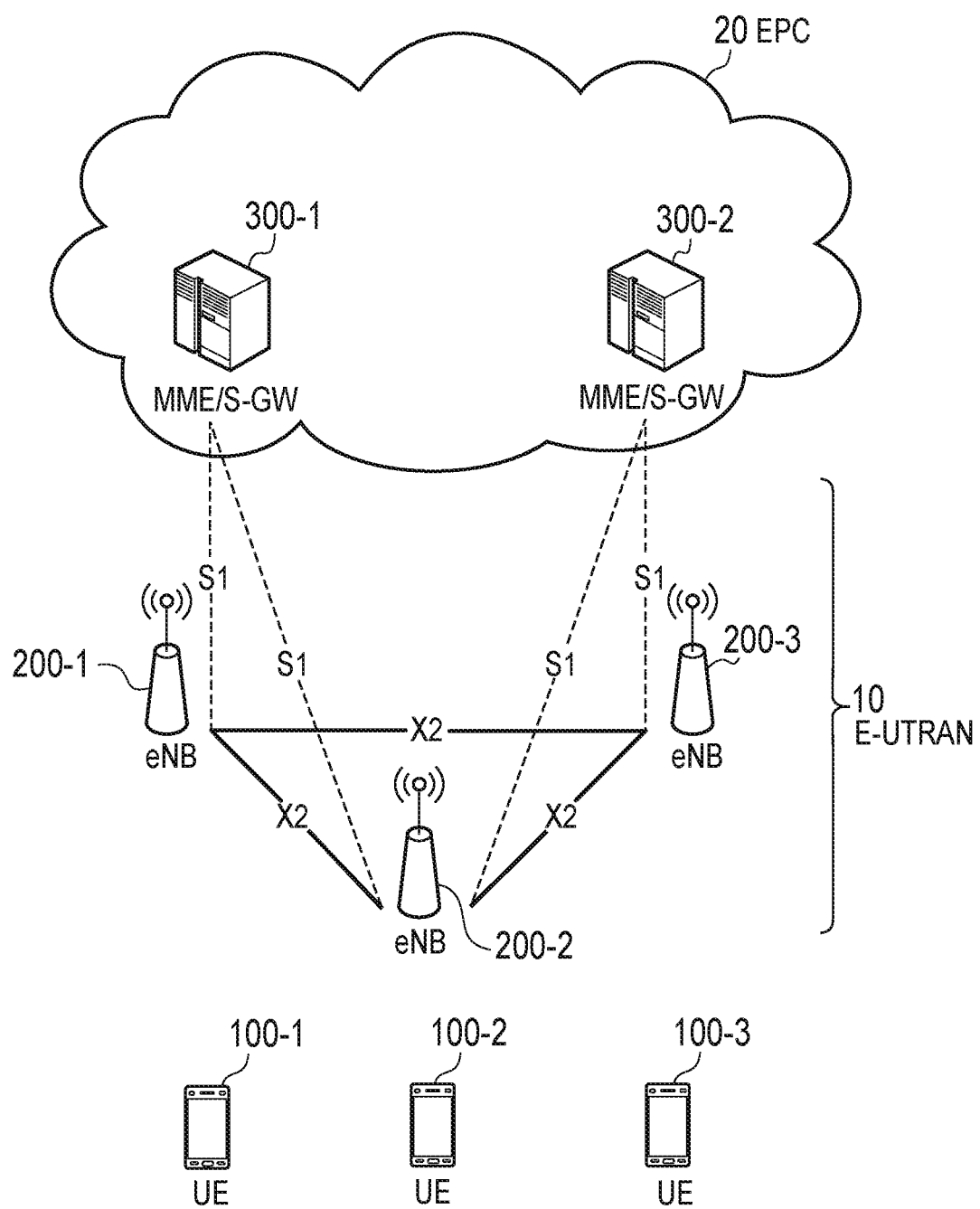
FIG. 1 is a configuration diagram of an LTE system according to a first embodiment to a sixth embodiment.

FIG. 1 is a configuration diagram of an LTE system according to a first embodiment.

As illustrated in FIG. 1, the LTE system according to the first embodiment includes UE (User Equipment) 100, E-UTRAN (Evolved-UMTS Terrestrial Radio Access Network) 10, and EPC (Evolved Packet Core) 20.

The UE 100 corresponds to a user terminal. The UE 100 is a mobile communication device, which performs radio communication with a cell (a serving cell). The configuration of the UE 100 will be described later.

The E-UTRAN 10 corresponds to a radio access network. The E-UTRAN 10 includes eNB 200 (an evolved Node-B). The eNB 200 corresponds to a base station. The eNBs 200 are connected mutually via an X2 interface. The configuration of the eNB 200 will be described later.

The eNB 200 manages one or a plurality of cells, and performs radio communication with the UE 100 that establishes a connection with a cell of the eNB 200. The eNB 200 has a radio resource management (RRM) function, a routing function of user data, a measurement control function for mobility control and scheduling and the like. The "cell" is used as a term indicating a smallest unit of a radio communication area, and is also used as a term indicating a function of performing radio communication with the UE 100.

The EPC 20 corresponds to a core network. The EPC 20 includes MME (Mobility Management Entity)/S-GW (Serving-Gateway) 300. The MME performs different types of mobility control and the like for the UE 100. The S-GW performs transfer control of the user data. The MME/S-GW 300 is connected to the eNB 200 via an S1 interface. It is noted that the E-UTRAN 10 and the EPC 20 constitute a network of the LTE system.

Figure 2:
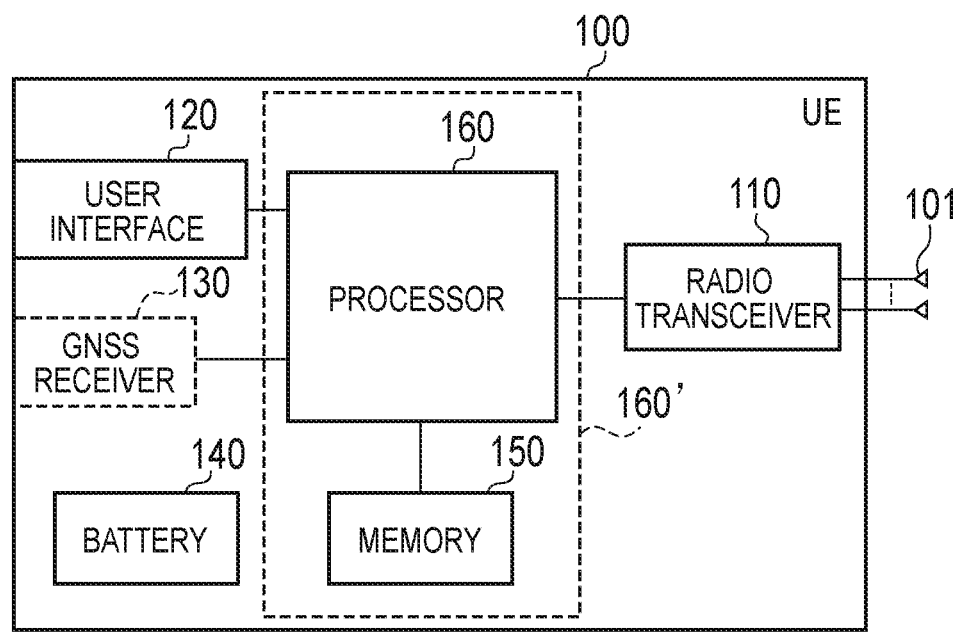
FIG. 2 is a block diagram of UE according to the first embodiment to the sixth embodiment.

FIG. 2 is a block diagram of the UE 100. As illustrated in FIG. 2, the UE 100 includes a plurality of antennas 101, a radio transceiver 110, a user interface 120, a GNSS (Global Navigation Satellite System) receiver 130, a battery 140, a memory 150, and a processor 160. The memory 150 and the processor 160 configure a control unit. The UE 100 may not necessarily have the GNSS receiver 130. Furthermore, the memory 150 may be integrally formed with the processor 160, and this set (that is, a chip set) may be called a processor 160'.

The antenna 101 and the radio transceiver 110 are used to transmit and receive a radio signal. The radio transceiver 110 converts a baseband signal (a transmission signal) output from the processor 160 into a radio signal, and transmits the radio signal from the antenna 101. Furthermore, the radio transceiver 110 converts a radio signal received by the antenna 101 into a baseband signal (a reception signal), and outputs the baseband signal to the processor 160.

The user interface 120 is an interface with a user carrying the UE 100, and includes, for example, a display, a microphone, a speaker, and various buttons. The user interface 120 receives an operation from a user and outputs a signal indicating the content of the operation to the processor 160. The GNSS receiver 130 receives a GNSS signal in order to obtain location information indicating a geographical location of the UE 100, and outputs the received signal to the processor 160. The battery 140 accumulates a power to be supplied to each block of the UE 100.

The memory 150 stores a program to be executed by the processor 160 and information to be used for processing by the processor 160. The processor 160 includes a baseband processor that performs modulation and demodulation, encoding and decoding and the like on the baseband signal, and a CPU (Central Processing Unit) that performs various types of processes by executing the program stored in the memory 150. The processor 160 may further include a codec that performs encoding and decoding on sound and video signals. The processor 160 executes various types of processes and various types of communication protocols described later.

Figure 3:
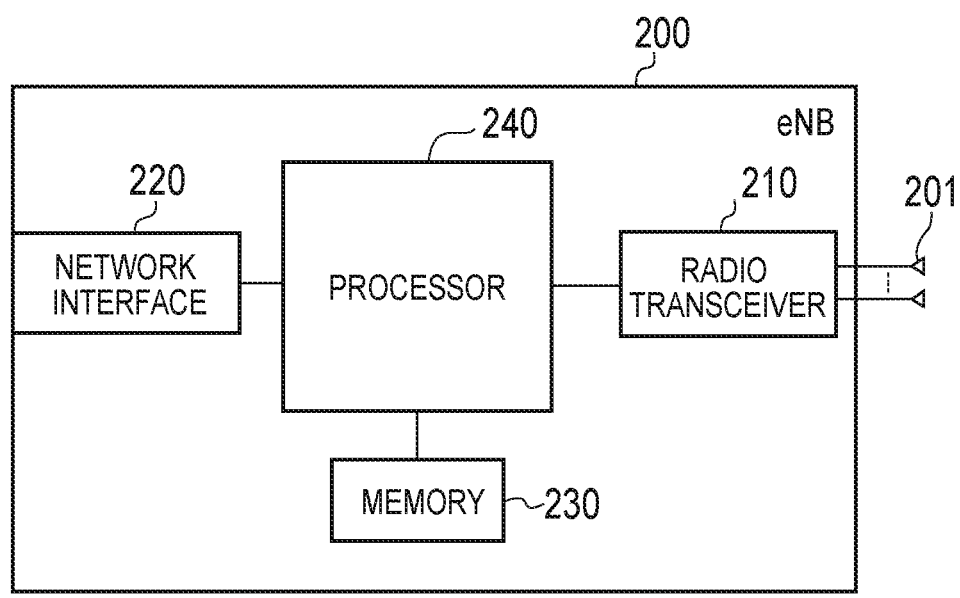
FIG. 3 is a block diagram of eNB according to the first embodiment to the sixth embodiment.

FIG. 3 is a block diagram of the eNB 200. As illustrated in FIG. 3, the eNB 200 includes a plurality of antennas 201, a radio transceiver 210, a network interface 220, a memory 230, and a processor 240. The memory 230 and the processor 240 configure a control unit. Furthermore, the memory 230 may be integrally formed with the processor 240, and this set (that is, a chipset) may be called a processor.

The antenna 201 and the radio transceiver 210 are used to transmit and receive a radio signal. The radio transceiver 210 converts a baseband signal (a transmission signal) output from the processor 240 into a radio signal, and transmits the radio signal from the antenna 201. Furthermore, the radio transceiver 210 converts a radio signal received by the antenna 201 into a baseband signal (a reception signal), and outputs the baseband signal to the processor 240.

The network interface 220 is connected to the neighboring eNB 200 via the X2 interface and is connected to the MME/S-GW 300 via the S1 interface. The network interface 220 is used in communication performed on the X2 interface and communication performed on the S1 interface.

The memory 230 stores a program to be executed by the processor 240 and information to be used for processing by the processor 240. The processor 240 includes a baseband processor that performs modulation and demodulation, encoding and decoding and the like on the baseband signal and a CPU that performs various types of processes by executing the program stored in the memory 230. The processor 240 executes various types of processes and various types of communication protocols described later.

Figure 4:
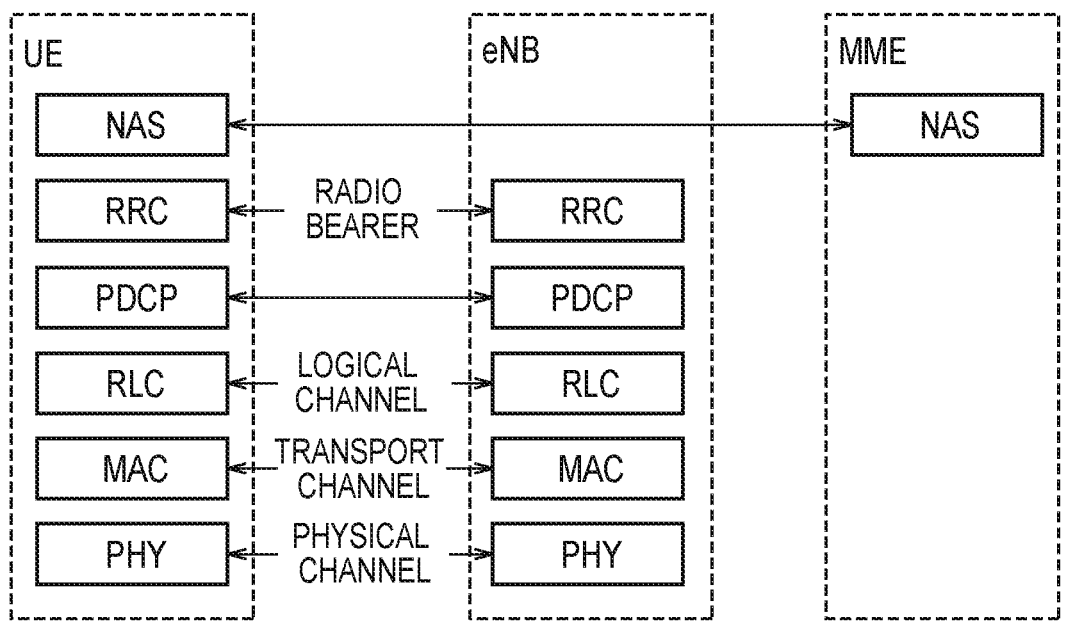
FIG. 4 is a protocol stack diagram of a radio interface according to the first embodiment to the sixth embodiment.

FIG. 4 is a protocol stack diagram of a radio interface in the LTE system. As illustrated in FIG. 4, the radio interface protocol is classified into a first layer to a third layer of an OSI reference model, such that the first layer is a physical (PHY) layer. The second layer includes a MAC (Medium Access Control) layer, an RLC (Radio Link Control) layer, and a PDCP (Packet Data Convergence Protocol) layer. The third layer includes an RRC (Radio Resource Control) layer.

The physical layer performs encoding and decoding, modulation and demodulation, antenna mapping and demapping, and resource mapping and demapping. Between the physical layer of the UE 100 and the physical layer of the eNB 200, user data and control signals are transmitted via a physical channel.

The MAC layer performs priority control of data, a retransmission process by a hybrid ARQ (HARQ), a random access procedure, and the like. Between the MAC layer of the UE 100 and the MAC layer of the eNB 200, user data and control signals are transmitted via a transport channel. The MAC layer of the eNB 200 includes a scheduler for determining a transport format (a transport block size and a modulation and coding scheme) of an uplink and a downlink, and a resource block to be assigned to the UE 100.

The RLC layer transmits data to an RLC layer of a reception side by using the functions of the MAC layer and the physical layer. Between the RLC layer of the UE 100 and the RLC layer of the eNB 200, user data and control signals are transmitted via a logical channel.

The PDCP layer performs header compression and decompression, and encryption and decryption.

The RRC layer is defined only in a control plane that handles control signals. Between the RRC layer of the UE 100 and the RRC layer of the eNB 200, a control signal (an RRC message) for various types of settings is transmitted. The RRC layer controls a logical channel, a transport channel, and a physical channel according to the establishment, re-establishment, and release of a radio bearer. When there is a connection (an RRC connection) between the RRC of the UE 100 and the RRC of the eNB 200, the UE 100 is in an RRC connected state. Otherwise, the UE 100 is in an RRC idle state.

An NAS (Non-Access Stratum) layer positioned above the RRC layer performs session management, mobility management and the like.

Figure 5:
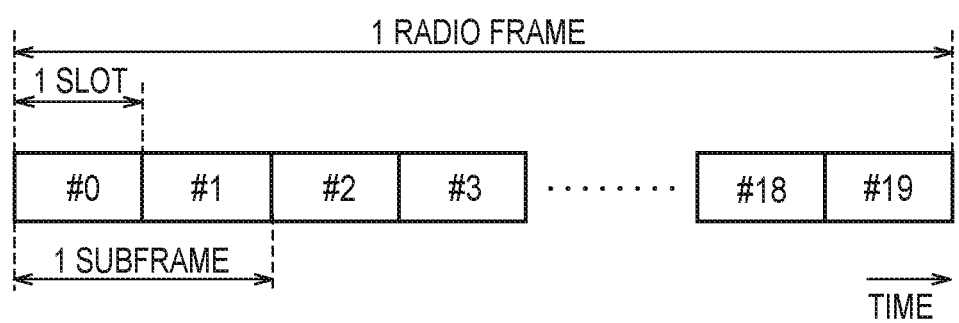
FIG. 5 is a configuration diagram of a radio frame used in the LTE system according to the first embodiment to the sixth embodiment.

FIG. 5 is a configuration diagram of a radio frame used in the LTE system. In the LTE system, OFDMA (Orthogonal Frequency Division Multiple Access) is applied to a downlink, and SC-FDMA (Single Carrier Frequency Division Multiple Access) is applied to an uplink, respectively.

As illustrated in FIG. 5, a radio frame is configured by 10 subframes arranged in a time direction. Each subframe is configured by two slots arranged in the time direction. Each subframe has a length of 1 ms and each slot has a length of 0.5 ms. Each subframe includes a plurality of resource blocks (RBs) in a frequency direction, and a plurality of symbols in the time direction. Each resource block includes a plurality of subcarriers in the frequency direction. Of the radio resources (time and frequency resources) assigned to the UE 100, a frequency resource can be identified by a resource block and a time resource can be identified by a subframe (or a slot).

In the downlink, an interval of several symbols at the head of each subframe is a region used as a physical downlink control channel (PDCCH) for mainly transmitting a control signal. Furthermore, the remaining interval of each subframe is a region available as a physical downlink shared channel (PDSCH) for mainly transmitting user data.

In the uplink, both ends in the frequency direction of each subframe are regions used as a physical uplink control channel (PUCCH) for mainly transmitting a control signal. The other portion in each subframe is a region available as a physical uplink shared channel (PUSCH) for mainly transmitting user data.

(2) MBMS

The LTE system according to the first embodiment supports MBMS (Multimedia Broadcast Multicast Service). In the MBMS, the UE 100 receives multimedia data (MBMS data) distributed by multicast or broadcast from a network. The UE 100 is capable of receiving MBMS data not only in the RRC connected state but also in the RRC idle state.

Figure 6:
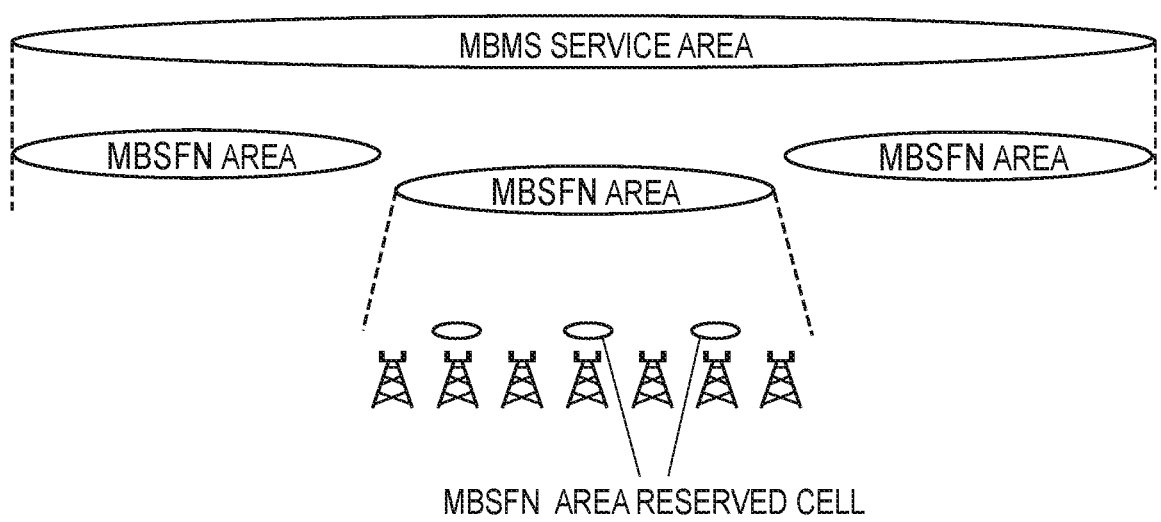
FIG. 6 is a configuration diagram of an MBMS area according to the first embodiment to the sixth embodiment.

FIG. 6 is a diagram showing an area where MBMS is provided. As shown in FIG. 6, one MBSFN (Multicast-Broadcast Single-Frequency Network) area is configured by a plurality of cells, and an MBMS service area is configured by a plurality of MBSFN areas. One cell may belong to a plurality of MBMS areas.

Figure 7:
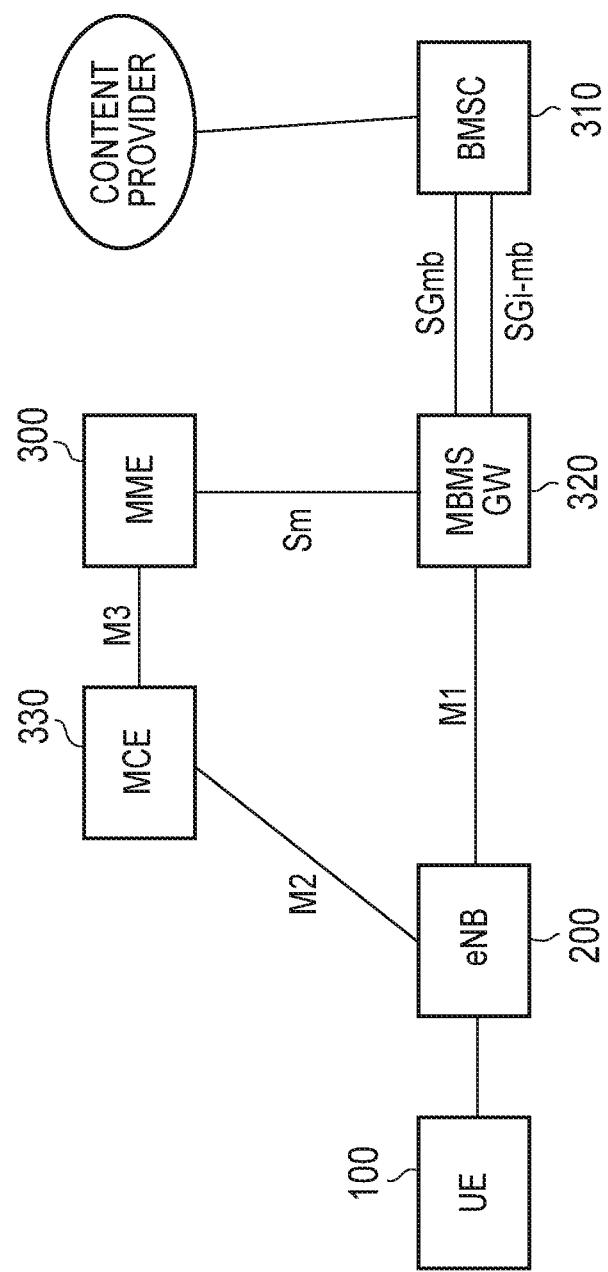
FIG. 7 is a configuration diagram of an MBMS system according to the first embodiment to the sixth embodiment.

FIG. 7 is a diagram showing a network configuration related to MBMS. As shown in FIG. 7, BMSC (Broadcast Multicast Service Center) 310 provides a function of distributing MBMS data. MBMS-GW (MBMS gateway) 320 broadcasts MBMS data to each eNB 200. MCE (Multi-cell Coordination Entity) 330 controls a radio resource used by each eNB 200 in the same MBSFN area or sets an MBSFN subframe.

(3) MBMS Measurement Control Method According to First Embodiment

A network is not capable of comprehending whether or not MBMS data is received in a good reception state. Therefore, it is difficult to optimize a network for improving a reception state of MBMS data.

On the other hand, in the LTE system, as a function of optimizing a network, MDT (Minimization of Drive Test) is specified. In Existing MDT, which is a currently defined MDT method, the UE 100 measures and collects reception quality on the basis of measurement information (Existing MDT Configuration) on the MDT notified from the eNB 200.

In the MDT, it is considered to support a measurement relating to MBMS (MBSFN MDT). Specifically, it is considered that the eNB 200 sets measurement information of the MBSFN MDT (MBSFN MDT Configuration) to the UE 100 and the UE 100 measures a reception quality of MBMS.

Using FIG. 13, a sequence of a case where the measurement information of the MBSFN MDT is set to the UE 100 will be described.

The eNB 200 holds measurement information of MBSFN MDT, a Trace ID, and another setting information (S1301). The Trace ID is an identifier used for uniquely distinguishing measurement information. The UE 100 is capable of distinguishing, from the Trace ID, a timing when measurement information is set and whether measurement information is current or past information.

The eNB 200 broadcasts the setting of MBMS (MBMS Configuration) into the area of the eNB 200 (S1302). More specifically, the measurement information of the MBSFN MDT is transmitted.

Only UE 100-4 that supports the MBMS sets the measurement information of the MBSFN MDT and starts measuring and collecting the MBMS reception quality. It is noted that UE 100-5 that does not support the MBMS does not implement MDT of the MBMS.

The UE 100-4 receives MBMS data and measures and collect the reception quality (S1305, S1306).

The UE 100-4 stops the measurement and collection (S1304, S1305). A reason for stopping the measurement and collection may be that a MBMS period expires and there are no more resources for the MDT, for example.

The UE 100-4 transmits Available Indication (Availability Indicator) indicating that it is possible to utilize the result of the measurement and collection by the MDT, to the eNB 200 (S1307).

Upon reception of an instruction from the eNB 200 (S1308 Log retrieve), the UE 100-4 reports the collection result of the reception quality. This message includes the Trace ID (Log reporting w/Trace ID).

Here, when the Existing MDT and the MBSFN MDT coexist, it is not realistic from a viewpoint of a load of the UE 100, for example, for the UE 100 to set the information elements for two MDTs and measure and collect the simultaneously designated reception qualities. Therefore, it is necessary to define a plurality of MDT functions on the assumption that there is one MDT simultaneously set by the UE 100.

On the other hand, in order to support MDT also in the MBMS, the eNB 200 simultaneously transmits instructions for the Existing MDT and the MBSFN MDT by individual signaling, multicast, or broadcast, to the UE 100.

Thus, the eNB 200 needs to appropriately recognize the setting, in the UE 100, of the Existing MDT and the MBSFN MDT. In particular, during a handover, eNB 200-2 to which the handover is made need to acquire the setting of MDT for the UE 100 and make appropriate control thereof.

Figure 8:
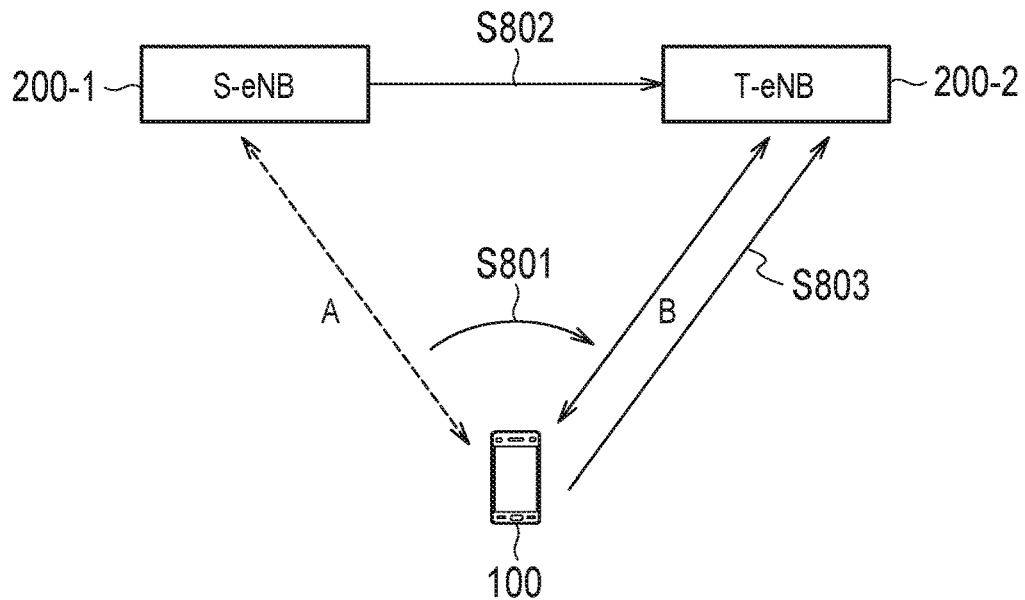
FIG. 8 is a configuration diagram of the LTE system according to the first embodiment.

By using FIG. 8, an operation during a handover according to the first embodiment will be described.

The UE 100, to which the measurement information of the Existing MDT or the MBMS MDT is set, communicates with eNB 200-1 from which the handover is made (not shown).

The UE 100 in a state of communicating with the eNB 200-1 performs the handover to the eNB 200-2 and switches communication paths from a connection A to a connection B (S801).

During the handover, the eNB 200-1 notifies the eNB 200-2 of information on the setting of the MDT for the UE 100, and the eNB 200-2 acquires information on the setting of the MDT for the UE 100 (S802). The information on the setting of the MDT for the UE 100 is identification information indicating whether the UE 100 sets the measurement information of the Existing MDT or the measurement information of the MBSFN MDT.

Further, during the handover, the UE 100 performs a process relating to the connection B with the eNB 200-2, for example, an RRC configuration (S803).

Instead of S802, in a procedure in S803, the UE may notify eNB 200-2 of the identification information.

The eNB 200-2 is capable of recognizing, by the identification information, that the Existing MDT or the MBSFN MDT is already set to the UE 100. Thus, the eNB 200-2 is capable of controlling to not instruct the MDT when there is no need of newly instructing the MDT. For example, the eNB 200-2 is capable of avoiding a need of instructing again the setting of the MBMS MDT when the measurement information of the Existing MDT or the measurement information of the MBSFN MDT is already set to the UE 100.

Second Embodiment

Figure 9:
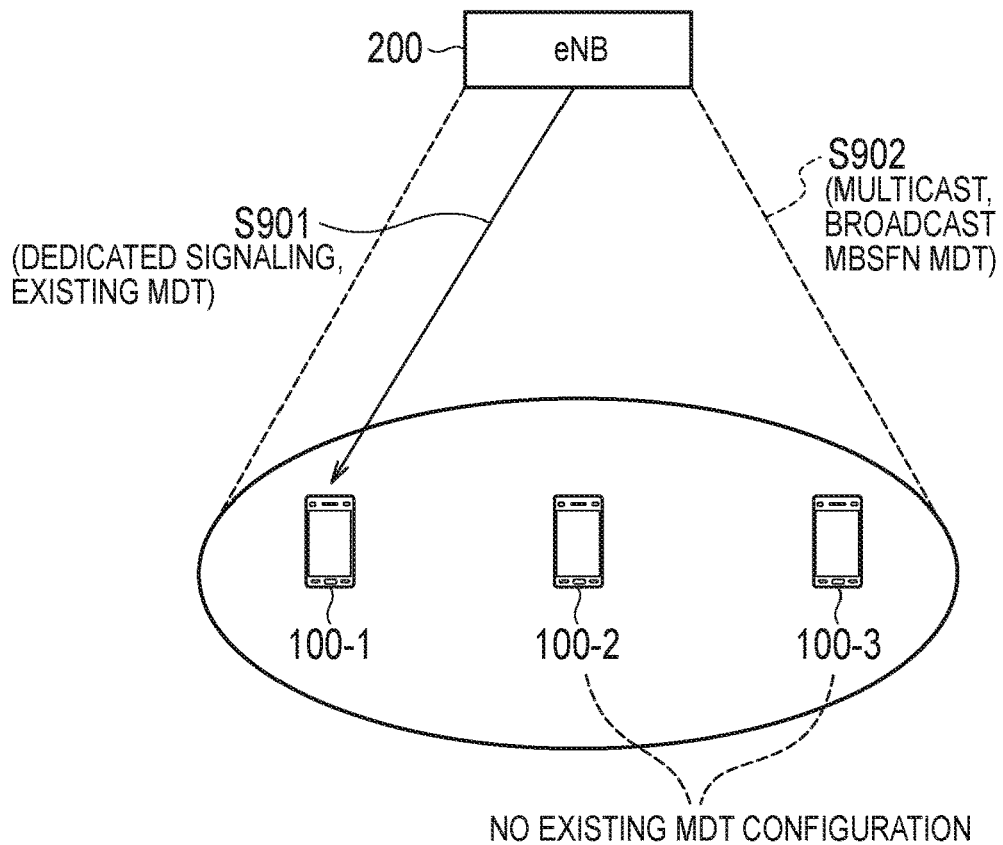
FIG. 9 is a configuration diagram of the LTE system according to the second embodiment.

By using FIG. 9, a second embodiment will be described. It is noted that a description for the same operation as that of the first embodiment will be omitted.

In the Existing MDT, a network function of the EPC 20, for example, selects the UE 100 on the basis of a contract, and the eNB 200 uses the individual signaling to instruct the setting of the measurement information of the Existing MDT to the UE 100. For example, the eNB 200 instructs, by individual signaling, the UE 100-1 selected by the network function to set the measurement information of the Existing MDT (S901).

On the other hand, in the MBMS MDT, the eNB 200 instructs, by broadcast or multicast, the UE that supports the MBMS MDT in the area to set the measurement information of the MBSFN MDT. For example, the eNB 200 transmits, by broadcast or multicast, an instruction to set the measurement information of the MBSFN MDT, to the area of the eNB 200. The UE 100-1, the UE 100-2, and the UE 100-3 that support the MBMS MDT in the area receive the MBSFN MDT (S902).

Here, the UE 100-1 separately receives an instruction to set the Existing MDT, and therefore, it is not preferable to prioritize the setting of the MBSFN MDT received by broadcast or multicast, which is an instruction to an unspecified large number of UEs. The UE 100 is capable only of setting one MDT at the same time, and thus, the UE 100-1 maintains the setting of the measurement information of the Existing MDT and continues the measurement and collection. The UE 100-1 ignores an instruction regarding the received MBSFN MDT.

On the other hand, upon receiving an instruction to set the measurement information of the MBMS MDT, the UE 100-2 and the UE 100-3 to which the Existing MDT is not set, set the measurement information of the MBMS MDT (S902).

However, even in this case, upon receiving, by individual signaling, an instruction to set the Existing MDT, the UE 100-2 or the UE 100-3 sets the measurement information of the Existing MDT and measures and collects the reception quality instructed by the Existing MDT. The UE 100-2 or the UE 100-3 stops measuring and collecting the reception quality using the measurement information of the MBSFN MDT.

It is noted that the UE 100-2 or the UE 100-3 may discard a log of the MBMS MDT that is in the middle of being collected and may report the log to the eNB 200 at a particular timing.

Further, upon reception of the measurement information of the Existing MDT, the UE 100-2 or the UE 100-3 may discard the measurement information of the MBSFN MDT, and when a predetermined status is satisfied after the measurement by the measurement information of the Existing MDT, the UE 100-2 or the UE 100-3 may resume measuring and collecting the reception status by the measurement information of the MBMS MDT.

Third Embodiment

Figure 10:
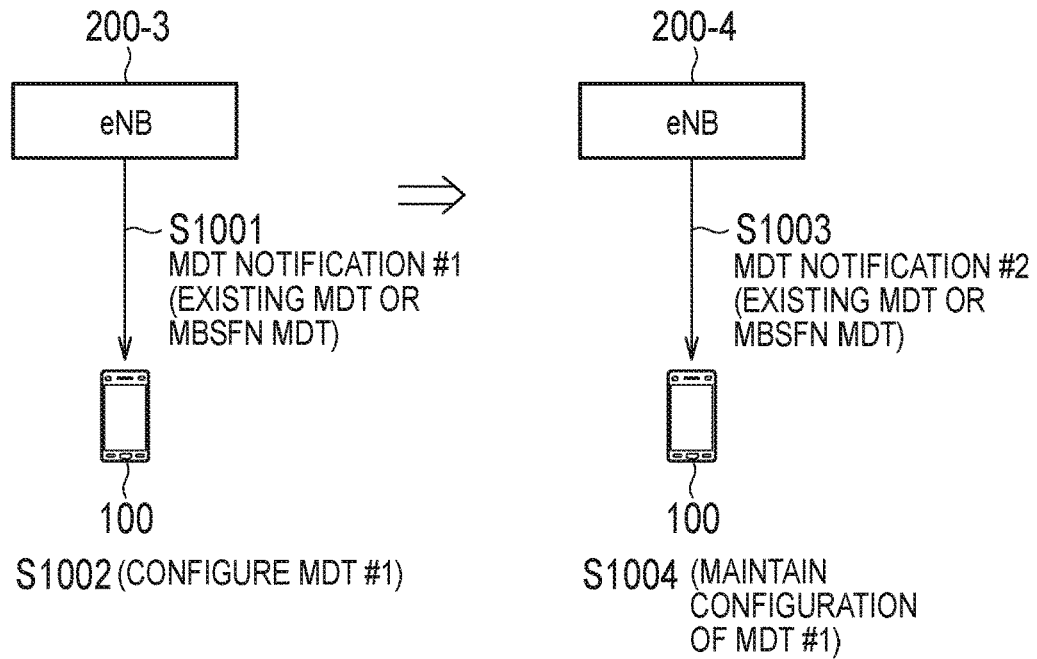
FIG. 10 is a configuration diagram of the LTE system according to the third embodiment.

By using FIG. 10, a third embodiment will be described. It is noted that a description for the same operation as that of the first embodiment and the second embodiment will be omitted.

There is a case where the reception status is preferably measured and collected to the end by using not the types of the MDT but using the previously set measurement information of the MDT, in view of effectively measuring and collecting the reception status by the MDT.

The eNB 200-3 transmits an MDT setting notification #1 to the UE 100 (S1001). Here, in the MDT setting notification

1, the measurement information of the MBSFN MDT may be included, and the measurement information of the Existing MDT may be included.

Further, the eNB 200-3 may transmit the MDT setting notification #1 by using either one of individual signaling, broadcast, or multicast.

When the UE 100 does not set the measurement information of the MDT, the UE 100 sets the measurement information included in the notified MDT setting notification #1 to measure and collect the reception quality.

The UE 100 moves to the area of eNB 200-4 and receives an MDT notification #2 from the eNB 200-4 (S1003). The MDT notification #2 may be the Existing MDT or the MBSFN MDT, similarly to the MDT #1.

Further, the eNB 200-4 may transmit the MDT setting notification #2 by using either one of individual signaling, broadcast, or multicast, similarly to the MDT setting notification #1.

In the present embodiment, even when the MDT #2 is notified, the UE 100 maintains the setting by the measurement information, notified by the MDT #1. The UE 100 may ignore the received MDT #2.

It is noted that when the UE 100 is in a connected state (RRC connected state), the UE 100 may transmit, to the eNB 200-4, a notification (Reject Message) indicating that the UE 100 does not set the MDT #2. Alternatively, the UE 100 may respond to the eNB 200-4 that the UE 100 sets the MDT #1.

Further, as another operation method, a method may be possible where the UE 100 always operates by setting the latest measurement information of the MDT. The reason for this is that, it is highly probable that the latest MDT has a setting where the network desires the measurement and collection.

In this case, when the UE 100 sets the MDT and receives a notification to set MDT by individual signaling, broadcast, or multicast, the UE 100 sets the measurement information of the MDT, which is notified later.

Alternatively, when the UE 100 receives a notification to set MDT by individual signaling, broadcast, or multicast, the UE 100 specifies a timing at which the already set measurement information of MDT is set by a network and a timing at which a newly notified measurement information of MDT is set by a network, from measurement information of MDT. After being specified, the UE 100 specifies the measurement information of the MDT in which the setting timing is newer.

Fourth Embodiment

Figure 11:
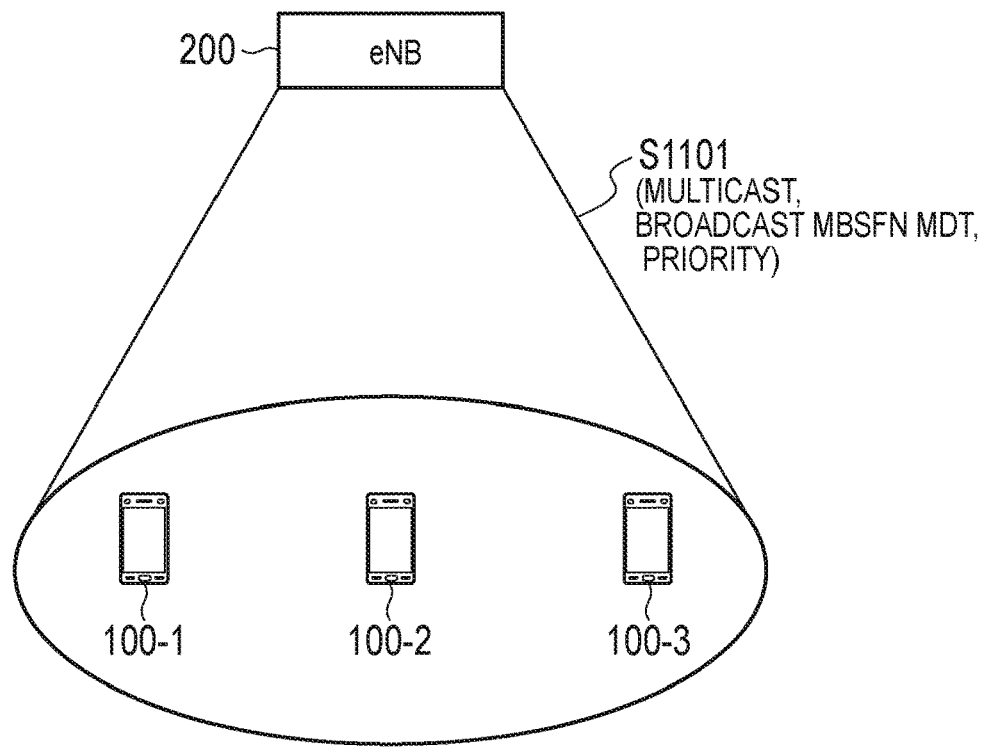
FIG. 11 is a configuration diagram of the LTE system according to the fourth embodiment.

By using FIG. 11, a fourth embodiment will be described. It is noted that a description for the same operation as that of the first embodiment to the third embodiment will be omitted.

There is a case where the priorities of the Existing MDT and the MBSFN MDT is preferably notified from a viewpoint of easily realizing contention control when the UE 100 receives information of these MDTs, for example.

When transmitting, by broadcast or multicast, the measurement information of the MBMS MDT, in the area of the eNB 200, the eNB 200 notifies priority information (S1101). For example, the priority information may be notified by including it in an MBSFN measurement configuration message.

Here, the priority information is information for distinguishing the priority among the Existing MDT and the MBSFN MDT, in the UEs 100.

It is preferable to transmit, together with the priority information, information for specifying the UE 100 to which the priority information is applied. This enables an arbitrary UE or UE group only to measure and collect a reception status by the MDT that complies with the priority.

It is noted that the UE 100 that receives the priority notification and then sets the measurement information different from the currently set measurement information of the MDT may discard the log of the MBMS MDT in the middle of being collected, or may report the log to the eNB 200 at a particular timing.

Further, the UE 100 may discard the currently set measurement information of the MDT or may resume the collection when a predetermined status is satisfied.

Fifth Embodiment

By using FIG. 12, a fifth embodiment will be described. It is noted that a description for the same operation as that of the first embodiment to the fourth embodiment will be omitted.

The eNB 200 notifies the UE 100, by individual signaling, broadcast, or multicast, of measurement information of MBSFN MDT.

The measurement information of the MBSFN MDT is notified to the UE 100 by using different signals, and thus, it may be probable that a contention between the MBSFN MDTs occurs.

Therefore, the eNB 200 uses the individual signaling to notify the UE 100-1 in a connected state of MBSFN MDT measurement information. The UE 100-1 sets the measurement information received by individual signaling. On the other hand, the UE 100-1 ignores measurement information of MBSFN MDT received by broadcast or multicast.

Contrary thereto, the UE 100-2 and the UE 100-3 in an idle state set measurement information of MBSFN MDT received by broadcast or multicast.

The UE 100-1 uses the measurement information of the MBSFN MDT notified by individual signaling to measure and report a reception status of MBMS, even after transiting to an idle state. After transiting to an idle state, the UE 100-1 ignores measurement information of MBSFN MDT received by broadcast or multicast.

It is possible to avoid contention between MBSFN MDTs by using another method. For example, it is also possible to avoid contention by using a Trace ID. In this case, the UE 100 confirms a Trace ID and adopts the latest measurement information to avoid contention between MBSFN MDTs.

It is noted that a method may be adopted where when measurement information of MBSFN MDT is notified by broadcast or multicast, in order to avoid contention between MBSFN MDTs, the eNB 200 does not transmit MBSFN MDT by using individual signaling for a fixed period.

It may be possible that contention is avoided when the UE 100 prioritizes measurement information of MBSFN MDT transmitted by individual signaling.

When the UE 100 receives measurement information of MBSFN MDT by individual signaling in a state where measurement information of MBSFN MDT received by multicast or broadcast is set to the UE 100, the UE 100 updates the setting to the measurement information of the MBSFN MDT received by individual signaling.

Further, when the UE 100 receives the measurement information by multicast or broadcast in a state where measurement information in MBSFN MDT received by individual signaling is set to the UE 100, the UE 100 maintains the setting of the measurement information received by the individual signaling.

Sixth Embodiment

Next, a sixth embodiment will be described. It is noted that a description for the same operation as that of the first embodiment to the fifth embodiment will be omitted.

It is considered that measurement information of MBSFN MDT is transmitted by broadcast or multicast.

When the UE 100 receives measurement information of MBSFN MDT by broadcast or multicast, it is probable that reception information included in the measurement information is not an exact value. This is because when measurement information is transmitted by broadcast or multicast, a message is repeatedly transmitted.

The UE 100 sets an exact time (timeInfoUTC) at a time point at which measurement information of MBSFN MDT is received by broadcast or multicast, as absoluteTimeInfo. It is noted that the UE 100 may acquire the timeInfoUTC from GPS, for example.

Alternatively, the UE 100 reuses the existing absoluteTimeInfo; however, the UE 100 permits a content of the absoluteTimeInfo to be changed without a system information update notification.

Further, in a case of multiple logging, that is, when measurement information is set so that a plurality of log collections are performed simultaneously, it is necessary to accurately specify the collection time of each log and compare the log at the same time.

The UE may set a time stamp based on absoluteTimeInfo when the measurement information is received, for each log. Alternatively, the UE may specify a time by a method in which absoluteTimeInfo received first is applied to all the logs to compare the logs.

Other Embodiments

In the above-described embodiments, the MDT of MBMS and the Existing MDT are described; however, these may be also applied to between another MDT.

Each of the above-described embodiments may be implemented independently; two or more embodiments may be combined and implemented.

Furthermore, in each of the above-described embodiments, the LTE system is described as an example of the mobile communication system; however, the present disclosure may be applied not only to the LTE system but also to a system other than the LTE system.

Hereinbelow, additional remarks of the aforementioned embodiments will be described.

A mobile station according to an additional remark is configured with a logged MBSFN measurement in which a reception status of an MBMS is measured and collected by a logged MDT. The mobile station includes a controller configured to transmit an availability indicator to a network at a predetermined timing except when the logged MBSFN measurement is still ongoing, the availability indicator indicating an availability of the logged MBSFN measurement.

The controller is configured to perform a control not to transmit the availability indicator in response to the logged MBSFN measurement being still ongoing.

The predetermined timing is any one of timings of: a connection establishment with the network; a connection re-establishment with the network; and a handover in the network.

In case that the mobile station is configured with the logged MBSFN measurement, in response to the mobile station being further configured with a different type MDT than the logged MBSFN measurement, the controller is configured to override a configuration of the logged MBSFN measurement with a configuration of the different type MDT.

A measurement control method according to an additional remark is a method for a mobile station configured with a logged MBSFN measurement in which a reception status of an MBMS is measured and collected by a logged MDT. The measurement control method includes transmitting an availability indicator to a network at a predetermined timing except when the logged MBSFN measurement is still ongoing, the availability indicator indicating an availability of the logged MBSFN measurement.

A processor according to an additional remark is a processor to be equipped in a mobile station configured with a logged MBSFN measurement in which a reception status of an MBMS is measured and collected by a logged MDT. The processor is configured to transmit an availability indicator to a network at a predetermined timing except when the logged MBSFN measurement is still ongoing, the availability indicator indicating an availability of the logged MBSFN measurement.

1. Introduction

The need to support both existing MDT and MBSFN MDT simultaneously is not yet clear. This issue is further discussed in the additional remark along with proposals to minimize impact to the UE and the existing specifications.

2. Simultaneous MDT

As part of the discussion to incorporate MBSFN MDT with the existing MDT, much of the previous discussions have been geared towards the support for MBSFN MDT without impacting the existing MDT. The impact to the existing MDT should be considered from both the impact to the specification as well as the impact to the UE. However, in some cases less impact to the specification does not necessary imply less impact to the UE and vice versa. Previously, as part of the discussion on the support of the existing MDT, it had been decided that the UE will only need to support one MDT log. The support for multiple logs to support multiple RATs was excluded and the support for logged MDT in Connected was also excluded. Part of the reasons for excluding these options was to reduce the burden on the UE from both complexity and required memory. There shouldn't be any special provisions to allow simultaneous MDTs just to support MBSFN MDT. This would be significant departure from the existing MDT behavior for the UE.

Proposal 1: The UE should not be required to support simultaneous MDTs.

2.1. Support for Single MDT

DCCH based configuration is considered baseline; therefore the MBSFN MDT configuration is directly controlled on a per-UE basis.

Agreements

2. Immediate MDT for MBSFN is not supported in Rel-12.

1. RAN2 intends to support logged MDT for MBSFN measurements in RRC_CONNECTED. The final decision is to be taken based on stage-3 details.

3. We use DCCH based configuration as baseline.

3a. If time permits, we can try to support MCCH based configuration as well

With the above assumption, it should be possible for the network to prevent the configuration of another MDT type in case the UE has an on-going MDT session unless the on-going MDT session is no longer applicable (e.g., the UE is no longer interested in MBMS). In the case of Signalling Based Trace, the core network should be able to provide the proper coordination to configure the preferred MDT type to the UE, since the core network selects the UEs to perform either the existing MDT or the MBSFN MDT. However, since existing MDT and MBSFN MDT may not be coordinated it may not be possible to prevent simultaneous MDT for a particular UE.

For the case of Management Based Trace, it was decided that there was no need to transfer an MDT context (any related configuration information about measurement and reporting) between eNBs for Logged MDT in IDLE. In addition, MDT context is assumed to be released in the RAN nodes when the UE is in IDLE. The situation is different with MBSFN MDT since MBSFN MDT supports Logged MDT in Connected. If we follow the previous MDT agreement that the MDT configurations configured by management based trace will not propagate during handover then the target eNB does not know that the UE is already configured with either of the two MDTs, it is possible that the UE may be configured with a new MDT in which case simultaneous MDT may occur.

One of the ways to prevent simultaneous MDTs is to allow the UE to discard one of the MDTs in case the UE receives another type of MDT configuration. The two alternatives are as follows:

Alt A-1: The new MDT type will always overwrite the MDT that was previously configured to the UE.

Alt A-2: The new MDT type configuration will be discarded if the UE already has a configured MDT.

These two alternatives have the advantages that the eNB does not need to know the status of the UE's MDT configuration before initiating a new MDT configuration to the UE. However, Alt A-1 is more preferable since it was previously agreed as part of the existing MDT agreements that "When the network configures a new LOG MDT configuration, this will always replace any already configured LOG MDT configuration and the corresponding logging will be cleared at the same time."

In addition, the eNB may have specific reason(s) to configure a new MDT to the UE, possibly intentionally, since the UE's previous MDT may no longer be needed.

Proposal 2: To prevent simultaneous MDT, the UE will overwrite the MDT that was previously configured to the UE with the new MDT type.

2.2. Availability Indicator for MBSFN MDT

With the existing MDT, the UE includes the availability indicator at every transition from RRC Idle mode to RRC Connected mode even though the logging period has not ended. This often leads to the need for the network to retrieve partial logged data which in turn requires the network to combine data from multiple log retrievals. If the UE also has logs for MBSFN MDT there will be additional complexities for the network to sort out multiple logs from multiple MDTs.

To support MBSFN MDT, it had been suggested that a separate availability indicator be used to support MBSFN MDT. Having separate indicators so that the network will know which MDT log should be retrieved. However, there may be an issue with simply applying the same rules for the one-bit indicator as in the case for the existing MDT. For the case with the existing MDT, the availability indicator is only triggered upon connection establishment/re-establishment and handovers since the Logged MDT is only applicable for the Idle mode. However, since MBSFN MDT supports the MDT logging for both RRC Connected and Idle modes, it should be further clarified when the availability indicator should be triggered. The existing MDT assumes fractional data retrieval which may be manageable if the UE only performs logging while in IDLE. If the new availability indicator for MBSFN MDT were to be sent repeatedly while the UE is in the RRC Connected mode, this may substantially increase the number of fractional data retrievals along with increased signaling load. Before deciding on when the availability indicator should be triggered, the following alternatives for availability indicator should be considered:

Alt B-1: One bit is used to indicate log availability for MBSFN MDT as in the case for the existing MDT. It is FFS when the UE should trigger the availability indicator while logging in RRC_CONNECTED.

Table 1 shows UE/eNB handling with Alt B-1.

TABLE 1

| Indication bit | UE Handling | eNB handling |
|---|---|---|
| true | UE has logged data available for MBSFN MDT | eNB may choose to retrieve the MBSFN MDT log and/or configure the UE with a new MDT |

Alt B-2: One bit is used to indicate to the eNB when the UE has logged data available and the UE has completed the MBSFN MDT i.e., the duration period has expired.

Table 2 shows UE/eNB handling with Alt B-2.

TABLE 2

| Indication bit | UE Handling | eNB handling |
|---|---|---|
| true | UE has logged data available AND has completed MBSFN MDT configured previously | eNB may choose to retrieve the MBSFN MDT log and/or configure the UE with a new MDT. |

Alt B-3: Two-bit indicator is sent to the eNB. The first bit informs the eNB on whether the UE has any logged data available and the second bit informs the eNB whether the UE is still performing MDT measurements based on the previous configuration (i.e., the log duration has not expired).

Table 3 shows UE/eNB handling with Alt B-3.

TABLE 3

| | UE Handling | eNB handling |
|---|---|---|
| Indication bit #1 | | |
| true | UE has logged data | eNB may choose to retrieve the MBSFN MDT log. |
| Indication bit #2 | | |
| true | MBSFN MDT configuration has not ended. | If this bit is present, the eNB may choose not to configure a new MDT (either existing MDT or MBSFN MDT) to the UE to avoid simultaneous MDT. |

Table 4 provides a summary of the 3 alternatives along with their ability to handle the previously described issues:

TABLE 4

|  | Fractional data retrieval prevention in CONN | Supports the proper coordination of MDT configuration | Signaling load | Same rule as existing MDT |
|---|---|---|---|---|
| Alt B-1 | No | No | medium | Yes |
| Alt B-2 | Yes | No | low | No |
| Alt B-3 | Yes* | Yes | high | No |

*Even if the UE indicates logged data is available with bit#1, if the UE also indicates with bit#2 that the MBSFN MDT has not ended, the eNB may choose to not retrieve the log until the MBSFN MDT has completed.

The results of Table 4 suggest that either Alt B-2 or Alt B-3 can be used to assist the eNB in preventing frequent logged data retrieval, since both Alt B-2 and Alt B-3 has the possibility of indicating to the eNB whether the MBSFN MDT is completed. With respect to the support of the proper coordination of MDT configuration only Alt B-3 provides the proper indication to the eNB that the MBSFN MDT is already configured; however, it should be further discussed whether bit #2 should always be sent if an MDT configuration exists regardless of whether bit #1 is indicated. Although Proposal 2 may be used to prevent simultaneous MDTs, it isn't preferable for the eNB to configure a UE with a new MDT only to have the UE discard the previously configured MDT, since the previously configured MDT may be still desirable for the network. Instead, the eNB could choose a different UE without a previously configured MDT. In terms of signaling load, Alt B-2 is preferable since the UE only indicates log availability when the MBSFN MDT is completed. In contrast, Alt B-3 has the largest impact on signaling load since it does not reduce the log availability indication as compared to Alt B-1, but it also adds a new bit to indicate whether the MBSFN MDT is completed. Finally, the main advantage with Alt B-1 is the benefit of having consistent behavior as the existing MDT. However, the existing MDT only supports logging in IDLE while the MBSFN MDT supports logging in both IDLE and CONNECTED. Based on the above we should consider which of the alternatives should be adopted as the availability indicator for MBSFN MDT. Depending on the selected availability indicator we should also discuss when the indicator should be triggered, esp. while the UE is in the Connected mode.

Proposal 3: we should consider if one of the alternatives should be adopted as the availability indicator for MBSFN MDT.

As described above, a mobile station according to an embodiment includes a controller configured to execute processes of: receiving, from a network, configuration information that configures a multicast-broadcast single-frequency network (MBSFN) measurement; starting the MBSFN measurement based on the configuration information, wherein the controller measures and collects a reception status of a multimedia broadcast multicast service (MBMS) by a logged minimization of drive test (MDT); transmitting an availability indicator to the network at a predetermined timing in response to the MBSFN measurement being not ongoing, the availability indicator indicating an availability of logged MBSFN measurement; and controlling not to transmit the availability indicator in response to the MBSFN measurement being still ongoing, even if the mobile station has the logged MBSFN measurement at the predetermined timing.

The predetermined timing is any one of timings of: a connection establishment with the network; a connection re-establishment with the network; and a handover in the network.

In case that the mobile station is configured with the MBSFN measurement, in response to the mobile station being further configured with a different type MDT than the MBSFN measurement, the controller is configured to override a configuration of the MBSFN measurement with a configuration of the different type MDT.

A measurement control method according to an embodiment includes: receiving, from a network, configuration information that configures a multicast-broadcast single-frequency network (MB SFN) measurement; starting the MB SFN measurement based on the configuration information, wherein the mobile station measures and collects a reception status of a multimedia broadcast multicast service (MBMS) by a logged minimization of drive test (MDT); transmitting an availability indicator to the network at a predetermined timing in response to the MBSFN measurement being not ongoing, the availability indicator indicating an availability of logged MBSFN measurement; and controlling not to transmit the availability indicator in response to the MBSFN measurement being still ongoing, even if the mobile station has the logged MBSFN measurement at the predetermined timing.

The invention claimed is:

1. A mobile station, comprising:
   at least one processor configured to execute processes of:
   receiving a first minimization of drive test (MDT) configuration that configures a multicast-broadcast single-frequency network (MBSFN) measurement, from a network;
   performing and logging the MBSFN measurement based on the first MDT configuration;
   when a logged measurement is a non-MBSFN measurement:
   transmitting a non-MBSFN measurement availability indicator to the network at a timing of handover in the network, the non-MBSFN measurement availability indicator indicating an availability of logged non-MBSFN measurement;
   when a logged measurement is an MBSFN measurement:
   transmitting an MBSFN measurement availability indicator to the network at a timing of handover in the network in response to the MBSFN measurement being not ongoing, the MBSFN measurement availability indicator indicating an availability of logged MBSFN measurement; and
   controlling not to transmit the MBSFN measurement availability indicator to the network at the timing of handover in the network in response to the MBSFN measurement being still ongoing, even if the mobile station has the logged MBSFN measurement at the timing of handover in the network.

2. A measurement control method for a mobile station, comprising:
   receiving a first minimization of drive test (MDT) configuration that configures a multicast-broadcast single-frequency network (MBSFN) measurement, from a network;
   performing and logging the MBSFN measurement based on the first MDT configuration;
   when a logged measurement is a non-MBSFN measurement:
   transmitting a non-MBSFN measurement availability indicator to the network at a timing of handover in the network, the non-MBSFN measurement availability indicator indicating an availability of logged non-MBSFN measurement;

when a logged measurement is an MBSFN measurement:
    transmitting an MBSFN measurement availability indicator to the network at a timing of handover in the network in response to the MBSFN measurement being not ongoing, the MBSFN measurement availability indicator indicating an availability of logged MBSFN measurement; and
controlling not to transmit the MBSFN measurement availability indicator to the network at the timing of handover in the network in response to the MBSFN measurement being still ongoing, even if the mobile station has the logged MBSFN measurement at the timing of handover in the network.

3. A device for a mobile station, comprising:
at least one processor configured to cause the mobile station to:
receive a first minimization of drive test (MDT) configuration that configures a multicast-broadcast single-frequency network (MBSFN) measurement, from a network;
perform and log the MBSFN measurement based on the first MDT configuration;
when a logged measurement is a non-MBSFN measurement:
    transmit a non-MBSFN measurement availability indicator to the network at a timing of handover in the network, the non-MBSFN measurement availability indicator indicating an availability of logged non-MBSFN measurement;
when a logged measurement is an MBSFN measurement:
    transmit an MBSFN measurement availability indicator to the network at a timing of handover in the network in response to the MBSFN measurement being not ongoing, the MBSFN measurement availability indicator indicating an availability of logged MBSFN measurement; and
control not to transmit the MBSFN measurement availability indicator to the network at the timing of handover in the network in response to the MBSFN measurement being still ongoing, even if the mobile station has the logged MBSFN measurement at the timing of handover in the network.

\* \* \* \* \*